US008307717B2

(12) United States Patent
Buchman

(10) Patent No.: US 8,307,717 B2
(45) Date of Patent: Nov. 13, 2012

(54) METHOD AND APPARATUS FOR INSTALLING AN INSULATION MATERIAL TO A SURFACE AND TESTING THEREOF

(75) Inventor: Randall Loren Buchman, Broken Arrow, OK (US)

(73) Assignee: Refractory Anchors, Inc., Broken Arrow, OK (US)

( * ) Notice: Subject to any disclaimer, the term of this patent is extended or adjusted under 35 U.S.C. 154(b) by 1118 days.

(21) Appl. No.: 12/196,756

(22) Filed: Aug. 22, 2008

(65) Prior Publication Data

US 2010/0044348 A1 Feb. 25, 2010

(51) Int. Cl.
*G01N 3/20* (2006.01)
(52) U.S. Cl. .......................................... 73/850; 219/136
(58) Field of Classification Search ............... 73/760, 73/850
See application file for complete search history.

(56) References Cited

U.S. PATENT DOCUMENTS

| | | | |
|---|---|---|---|
| 3,204,083 A | 8/1965 | Fromm et al. | |
| 3,283,121 A * | 11/1966 | Bernard et al. | .......... 219/137.44 |
| 3,687,093 A | 8/1972 | Byrd, Jr. | |
| 3,706,870 A | 12/1972 | Sauder et al. | |
| 3,819,468 A | 6/1974 | Sauder et al. | |
| 3,940,244 A | 2/1976 | Sauder et al. | |
| 3,993,237 A | 11/1976 | Sauder et al. | |
| 4,032,742 A | 6/1977 | Kendrick et al. | |
| 4,088,825 A | 5/1978 | Carr | |
| 4,120,641 A | 10/1978 | Myles | |
| 4,154,975 A | 5/1979 | Sauder | |
| 4,177,036 A | 12/1979 | Sauder | |
| 4,248,023 A | 2/1981 | Dunlap | |
| 4,379,382 A | 4/1983 | Sauder | |
| 4,424,027 A | 1/1984 | Suey | |
| 4,443,509 A | 4/1984 | Sauder | |
| 4,479,337 A | 10/1984 | Crowley | |
| 4,574,995 A | 3/1986 | Sauder et al. | |
| 4,581,867 A | 4/1986 | Crowley | |
| 4,680,908 A | 7/1987 | Crowley | |
| 4,733,050 A * | 3/1988 | Grafius | ...................... 219/125.1 |
| 4,753,053 A | 6/1988 | Heard | |
| RE32,732 E | 8/1988 | Sauder et al. | |
| 4,850,171 A | 7/1989 | Deren | |
| 4,945,208 A * | 7/1990 | Lian | ......................... 219/137.61 |

(Continued)

FOREIGN PATENT DOCUMENTS

CA 1198172 12/1985

(Continued)

*Primary Examiner* — Max Noori
(74) *Attorney, Agent, or Firm* — Head, Johnson & Kachigian, P.C.

(57) ABSTRACT

A method and apparatus for installing an insulation material to a surface by inserting a nozzle and a neck of a welding gun through a channel in an insulation material, positioning the insulation material on the surface to be insulated using the welding gun, firmly pushing the welding gun into the channel of the insulation material until the nozzle of the welding gun, an anchor embedded in the insulation material and the surface are in contact, welding the anchor of the insulation material to the surface with the welding gun, and removing the nozzle and the neck of the welding gun from the channel in the insulation material. A method and apparatus for testing the integrity of a weld between an anchored insulation material, a surface and a nozzle of a welding gun. A special tool for testing the integrity of the weld between the anchored insulation material and a surface.

18 Claims, 10 Drawing Sheets

U.S. PATENT DOCUMENTS

| | | | |
|---|---|---|---|
| RE33,463 E | 11/1990 | Sauder et al. | |
| 4,984,405 A | 1/1991 | Sauder | |
| 5,010,706 A | 4/1991 | Sauder | |
| 5,014,482 A | 5/1991 | Alexander | |
| 5,115,114 A | 5/1992 | Paulonis et al. | |
| 5,353,567 A | 10/1994 | Knight et al. | |
| 5,618,491 A | 4/1997 | Kurup et al. | |
| 5,635,090 A * | 6/1997 | Lubieniecki | 219/137.42 |
| 5,918,911 A * | 7/1999 | Sims | 285/13 |
| 5,984,672 A | 11/1999 | Takigawa | |
| 6,051,806 A | 4/2000 | Shikata et al. | |
| 6,179,610 B1 | 1/2001 | Suey et al. | |
| 6,575,738 B1 | 6/2003 | Nguyen et al. | |
| 6,596,971 B1 | 7/2003 | Biskup et al. | |
| 7,049,545 B2 | 5/2006 | Matus et al. | |
| 7,247,815 B2 * | 7/2007 | Lajoie | 219/136 |
| 7,576,300 B2 * | 8/2009 | Giese | 219/137.61 |
| 7,761,985 B2 * | 7/2010 | Hegland et al. | 29/874 |
| 2005/0109748 A1 | 5/2005 | Albrecht et al. | |

FOREIGN PATENT DOCUMENTS

JP 54158336 12/1979

* cited by examiner

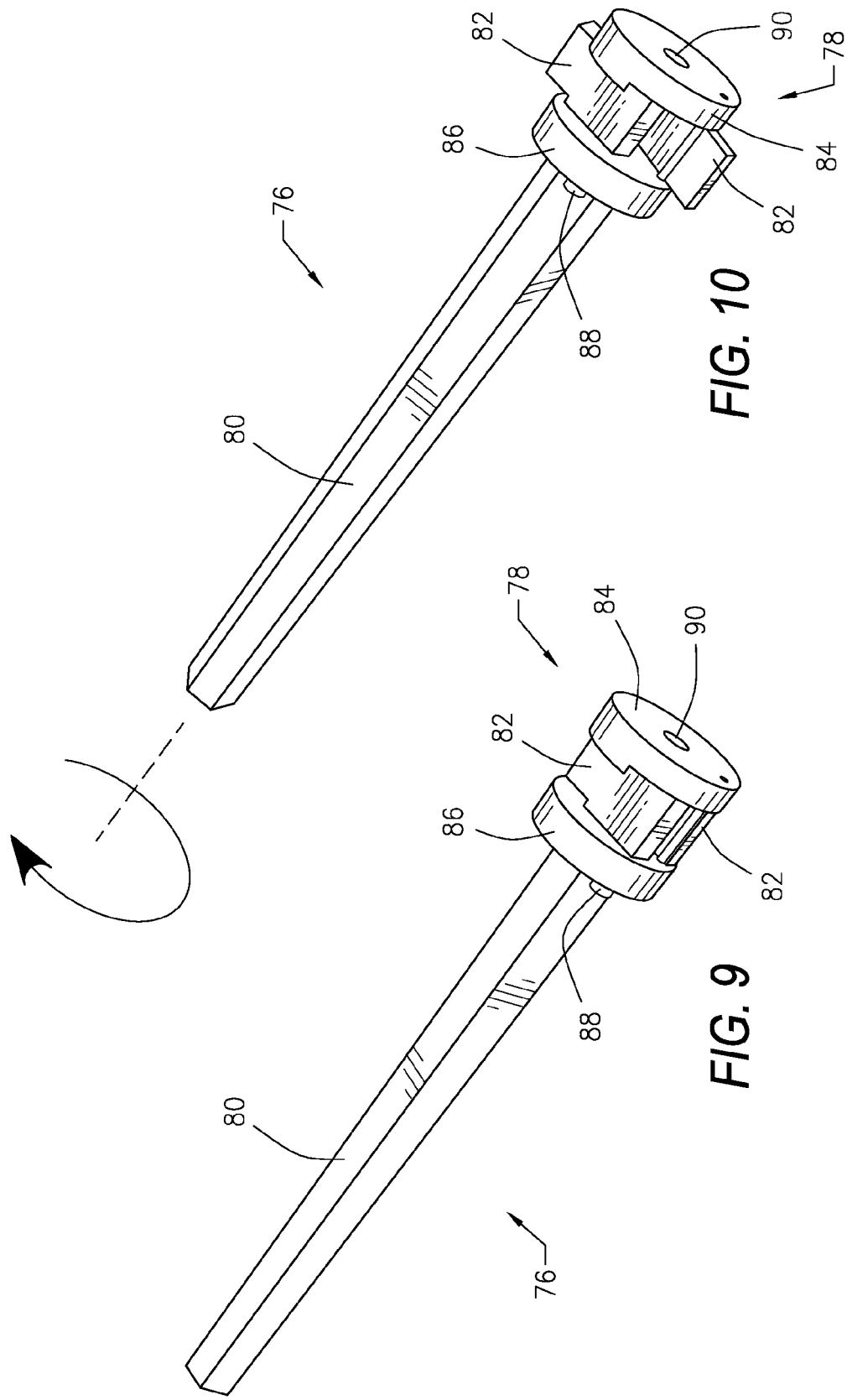

METHOD AND APPARATUS FOR INSTALLING AN INSULATION MATERIAL TO A SURFACE AND TESTING THEREOF

BACKGROUND OF THE INVENTION

1. Field of the Invention

This invention relates generally to a method and apparatus for installing an insulation material to a surface to be insulated and the testing thereof, and more particularly to a method and apparatus for installing an insulation material, such as a ceramic fiber module, to a surface, such as a boiler, an industrial furnace, a heat exchanger or other vessel or surface to be insulated, a method and apparatus for testing the integrity of a weld between an anchored insulation material, a surface and a nozzle of a welding gun, and a special tool for testing the integrity of the weld between an anchored insulation material and a surface.

2. Description of the Related Art

To attach refractory insulation materials to a surface of a vessels, such as furnaces, boilers, heat exchangers or other vessels requiring insulation materials, the gas metal arc welding (GMAW) process may be utilized. In North America, the GMAW process is commonly referred to as MIG (metal inert gas) welding; in Europe, the process is termed MAG (metal active gas) welding. "MIG" as used hereafter refers to both the MIG and the MAG GMAW processes. To produce these welds, either MIG spot or MIG spot plug welding techniques may be used.

A "MIG spot weld" is a timed MIG weld in which two metal components in contact are welded together. The MIG spot weld penetrates a top metal component (e.g., an anchor for an insulation material), and in doing so welds the top metal component to a bottom metal component (e.g., a surface, such as an interior surface, or a wall of a vessel).

A "MIG spot plug weld" is a timed spot weld made on a top metal component that has a bore. The top metal component is welded to a bottom component using a MIG spot plug weld. The MIG spot plug weld utilizes an electrode to provide a resulting weld that sufficiently covers the bore in the top metal component and provides sufficient weld penetration to join the top metal component to the bottom metal component. A MIG spot plug weld generally requires less energy than a spot weld because it is not necessary to penetrate two steel components. Furthermore, MIG spot plug welding generally provides welds that are stronger and more consistent than MIG spot welds.

The weld may be made using GMAW spray transfer, GMAW globular transfer or GMAW pulsed transfer. When a spray transfer mode is utilized, a 2-, 3- or 4-component shielding gas mixture is typically used, along with sufficient current and voltage to produce a stream of weld metal or a stream of weld droplets that cascade across an open arc from the electrode to the weld site. When weld droplets are evident, the droplets will be smaller than the diameter of the electrode utilized.

In globular transfer mode, an open arc process is used with a reactive gas, such as Ar or $CO_2$. Globular transfer mode utilizes less current and voltage than in spray transfer mode. The weld droplets generated are typically larger than the electrode diameter, and the globular weld droplet transfer is irregular.

In pulsed transfer mode, the pulse controls the droplet frequency across an electronically modified open arc. A peak weld current and background current are applied. This process enables an open arc mode of weld transfer of minuscule weld drops. This process can further provide controlled open arc weld transfer at considerably less current than with spray transfer mode.

To attach the insulation material to the surface of the vessel, the most common method used by insulation installers is to stud weld or fillet weld threaded studs on the surface of the vessel and attach carbon steel or stainless steel anchors to the studs. The insulation material is attached to the anchors and the anchors are screwed on to the studs. More specifically, the common method used by insulation installers is to stud weld or fillet weld threaded studs on the vessel by placing a metal stud having a machined protrusion tip in the stud gun. The stud is pressed against the surface of the vessel, and when the tip of the stud is in firm contact with the vessel, the stud gun trigger is pulled and a timed current is applied through the small protrusion tip at the end of the stud. The stud weld current melts the protrusion at the end of the stud tip and a high energy arc is generated between the stud and the grounded vessel. As the stud protrusion is melted, with the force applied to the stud gun, the stud is pushed tight against a ceramic shield located at the end of the stud. The ceramic shield assists in maintaining the necessary weld arc gap and also protecting the stud weld from the atmosphere. The timed weld arc melts the tip of the stud and with the manual force applied the stud is welded to the metal surface.

Insulation materials, such as ceramic fiber modules, are bundled about a carbon steel or stainless steel anchor and a system of support members. The ceramic fiber modules are typically prefabricated, with the embedded anchors being adapted to fit about the aforementioned studs in the vessel. Each ceramic fiber module is then secured to the threaded stud using a nut.

It is therefore desirable to provide a method and apparatus for installing an insulation material to a surface that provides a simplified and streamlined approach in anchoring insulation materials that utilizes only a single step without the inclusion of a stud.

It is further desirable to provide a method and apparatus for installing an insulation material to a surface that provides savings in materials and labor, as well as enhancements in reliability and that is useful in a variety of industrial applications.

It is still further desirable to provide a method and apparatus for installing an insulation material to a surface that may utilize a portable welding device capable of controlled, timed activity and creating a stronger and more consistent weld.

It is yet further desirable to provide a method and apparatus for installing an insulation material to a surface that is practiced without the use of threaded studs, nuts or torque tubes, thereby reducing material costs and eliminating potential failure points.

It is yet further desirable to provide a method and apparatus for installing an insulation material to a surface that utilizes a welding gun designed to hold and support the insulation material during installation.

It is yet further desirable to provide a method and apparatus for installing an insulation material to a surface that utilizes a welding gun having a straight or linear neck that enables a one-handed installation of the insulation material to the internal surface of the vessel.

It is yet further desirable to provide a method and apparatus for installing an insulation material to a surface that may utilize a continuity sensor that enables an installer to ensure optimum weld quality and consistency by confirming continuity of contact between the work pieces to be welded.

It is yet further desirable to provide a method and apparatus for installing an insulation material to a surface that may utilize a method and a special testing tool for ensuring the sufficiency of the resulting weld.

It is yet further desirable to provide a method and a special tool for testing the integrity of a weld between an anchored insulation material and a surface.

It is yet further desirable to provide a continuity sensor for confirming contact between an anchor of an insulation material and a grounded surface of a vessel.

SUMMARY OF THE INVENTION

In general, in a first aspect, the invention relates to a method for installing an insulation material to a surface having the steps of inserting a nozzle and a neck of a welding gun through a channel in an insulation material; positioning the insulation material on a surface to be insulated using the welding gun; firmly pushing the welding gun into the channel of the insulation material until the nozzle of the welding gun, an anchor embedded in the insulation material and the surface are in contact; welding the anchor of the insulation material to the surface with the welding gun; and removing the nozzle and the neck of the welding gun from the channel in the insulation material.

The method for installing the insulation material may also include confirming continuity of contact between the anchor of the insulation material and the surface. Confirming continuity of contact may be accomplished by a continuity sensor having an indicator mounted on the welding gun, such as a visual indicator, an audible indicator or combination thereof.

The method for installing the insulation material may further include performing a test on the step of welding the anchor using a special testing tool by inserting the special testing tool in a closed position into the channel of the insulation material; contacting a working end of the special testing tool to the anchor embedded in the insulation material; rotating an elongate handle of the special testing tool to cause the special testing tool to move from the closed position to an open position; engaging the working end of special testing tool with the anchor; applying a sufficient amount of torque to the handle of the special testing tool to test the integrity of the step of welding the anchor; rotating the handle to cause the special testing tool to move from the open position to the closed position; and removing the special testing tool from the channel in the insulation material. The test may be performed at an interval selected of after every weld, after a fixed number of welds, after a fixed period of time or at random.

The insulation material may be a ceramic fiber module having the anchor embedded therein. The ceramic fiber module has a hot face positioned away from the surface and a cold face positioned against the surface. The ceramic fiber module also has a pair of support rods interconnected with opposing ends of the anchor. The anchor includes a rear face exposed on an exterior of the cold face of the ceramic fiber module and also includes a plurality of substantially parallel, elongate protrusions protruding from a central portion of a front face of the anchor. The support rods of the ceramic fiber module may be substantially parallel to each other, substantially parallel to the cold face of the ceramic fiber module and substantially parallel to the surface. In addition, the central portion of the anchor may include a bore being sized up to approximately 0.75 inch, and the anchor may have a thickness between 9 gauge and 24 gauge.

The welding gun of the method for installing insulation material may be a portable metal inert gas welding gun wherein the neck of the welding gun is substantially straight or linear. The neck and the nozzle of the welding gun may have a combined length greater than a thickness of the insulation material, while the neck and the nozzle of the welding gun have a diameter sufficiently large to frictionally engage the channel in the insulation material. The nozzle of the welding gun may be constructed of brass or copper, include two or more V-shaped cut-outs and be insulated.

The method of installing the insulation material may utilize a metal inert gas spot weld or a metal inert gas spot plug weld. In addition, the method of installing the insulation material may utilize a weld transfer mode of gas metal arc welding spray transfer, gas metal arc welding globular transfer or gas metal arc welding pulsed transfer.

The welding of the anchor to the surface may include providing a current and a voltage from a power source to the welding gun using a power cable, opening and closing the power source via a variable timer control configured to provide spot weld arc time between approximately 0.25 seconds and approximately 4.0 seconds; feeding an electrode from a wire feed unit to the welding gun, and supplying a flow of a shielding gas from a source of shielding gas to the welding gun via a gas hose.

The power source may provide the current between approximately 100 amps and approximately 450 amps and may provide the voltage between approximately 20 volts and approximately 33 volts. The electrode can be carbon steel, stainless steel, austenitic nickel-based superalloy or flux-core welding wire, with a diameter between approximately 0.035 inches and approximately 0.0625 inches. The wire feed unit may be a portable, variable speed wire feed unit having a wire feed rate between approximately 200 inches per minute and approximately 1000 inches per minute and also having a variable burnback control that may be set between approximately 0.5 inch and approximately 1.57 inches. Also, the shielding gas may include one or more gases selected from the group consisting of carbon dioxide, argon, oxygen or helium, and the flow of the shielding gas may be between approximately 10 cubic feet per hour and approximately 90 cubic feet per hour.

The method of installing the insulation material may also include removing a cardboard tube from the channel in the insulation material and manipulating the insulation material to fill in the channel in the insulation material. Furthermore, the method for installing the insulation material may be performed using one-hand of an installer.

In general, in a second aspect, the invention relates to a method and a special tool for testing the integrity of a weld between an anchored insulation material and a surface. The method for testing the integrity of the weld includes inserting a special testing tool in a closed position into a channel in the insulation material; contacting a working end of the special testing tool to an anchor embedded in the insulation material; rotating an elongate handle of the special testing tool to cause the special testing tool to move from the closed position to an open position; engaging the working end of special testing tool with the anchor; applying a sufficient amount of torque to the handle of the special testing tool to test the integrity of the weld; rotating the handle to cause the special testing tool to move from the open position to the closed position; and removing the special testing tool from the channel in the insulation material.

The insulation material may be a ceramic fiber module having the anchor embedded therein. The ceramic fiber module may include a hot face positioned away from the surface and a cold face positioned against the surface and a pair of support rods interconnected with opposing ends of the anchor. The anchor may include a rear face exposed on an exterior of the cold face of the ceramic fiber module a plurality of substantially parallel, elongate protrusions protruding from a central portion of a front face of the anchor. The support rods of the ceramic fiber module can be substantially parallel to each other, substantially parallel to the cold face of the ceramic fiber module and substantially parallel to the surface.

The method for testing the integrity of the weld can further include removing a cardboard tube in the channel in the ceramic fiber module from the elongate protrusions of the anchor; inserting a special testing tool while in a closed position into the channel in the ceramic fiber module; contacting the pivot support plate of the working end of the special testing tool to the anchor embedded in the ceramic fiber module; rotating the handle of the special testing tool to cause the teeth of the working end of the special testing tool to move from the closed position to the open position; engaging the teeth of the working end of the special testing tool with the elongate protrusions of the anchor; applying a sufficient amount of torque to the handle of the special testing tool to test the integrity of the weld between the anchored ceramic fiber module and the surface; disengaging the teeth of the working end of the special testing tool from the elongate protrusions of the anchor; rotating the handle to cause the teeth of the working end of the special testing tool to move from the open position to the closed position; and removing the special testing tool from the channel in the ceramic fiber module.

The special testing tool for testing the integrity of the weld includes a working end and an opposing elongate handle. The handle of the special testing tool has a length greater than a thickness of the insulating material, while the working end has a pivot support plate and a fixed support plate. A pair of teeth are pivotally attached between the pivot support plate and the fixed support plate using a pair of corresponding shafts. The fixed support plate rigidly is attached to a terminal end of the handle, and the pivot support plate is linked to the fixed support plate via a central bearing shaft. The teeth of the working end of the special testing tool are capable of being selectively moved between an open position where the teeth are extended and a closed position where the teeth are retracted.

In general, in a third aspect, the invention relates to a continuity sensor for confirming contact between an anchor of an insulation material and a grounded surface. The continuity sensor includes a power source integrated into a welding gun, an indicator mounted on the welding gun, and an electrical wire connecting the power source, the indicator and a nozzle of the welding gun. The power source may be a 9 volt battery integrated into a handle of the welding gun, and the indicator may be a visual indicator, an audible indicator or a combination thereof, such an LED mounted on a handle of the welding gun that illuminates upon metal-to-metal contact between the nozzle of the welding gun, the anchor of the insulation material and the grounded surface or a speaker mounted on a handle of the welding gun for emitting a beep or a tone upon metal-to-metal contact between the nozzle of the welding gun, the anchor of the insulation material and the grounded surface.

BRIEF DESCRIPTION OF THE DRAWINGS

FIG. 9 is a perspective view of an example of a special testing tool in a closed position in accordance with an illustrative embodiment of the special tool for testing the integrity of a weld between an anchored insulation material and a surface disclosed herein;

FIG. 10 is a perspective view of an example of the special testing tool shown in FIG. 9 in an open position in accordance with an illustrative embodiment of the special tool for testing the integrity of a weld between an anchored insulation material and a surface disclosed herein.

Other advantages and features will be apparent from the following description, and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

Figure 1:
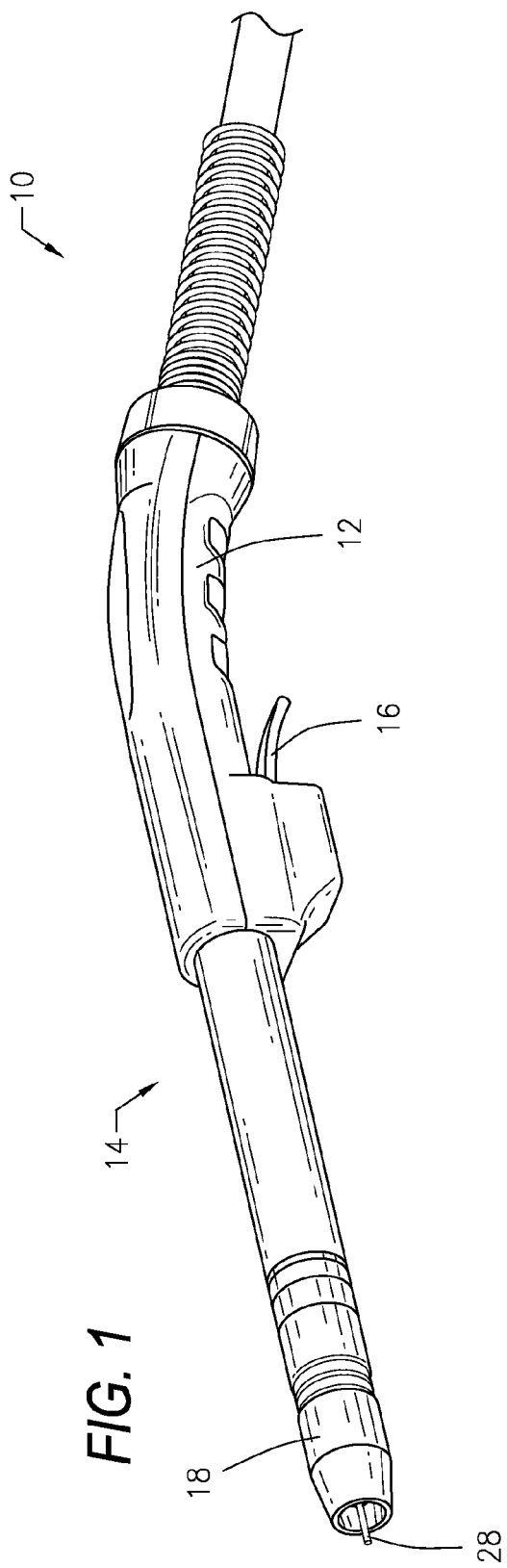
FIG. 1 is a perspective view of an example of a welding gun in accordance with an illustrative embodiment of the method and apparatus for installing an insulation material to a surface disclosed herein.
Figure 2:
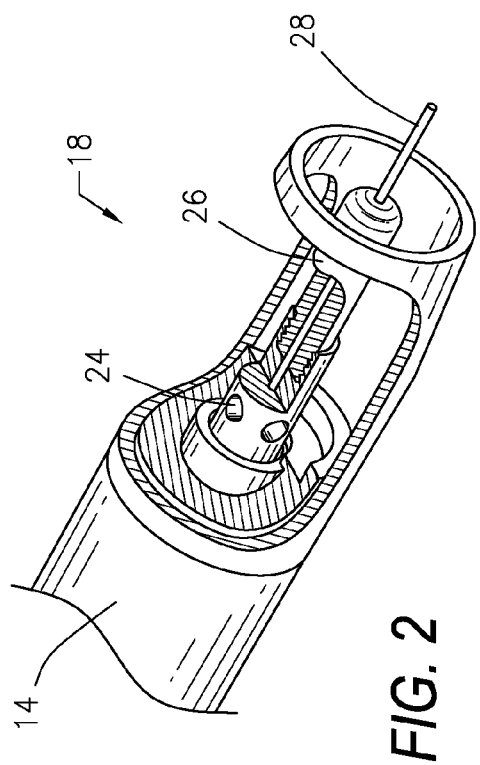
FIG. 2 is a cutaway view of the nozzle of the welding gun shown in FIG. 1 in accordance with an illustrative embodiment of method and apparatus for installing an insulation material to a surface as shown in FIG. 1.

Referring now to the figures of the drawings, wherein like numerals of reference designate like elements throughout the several views, and initially to FIGS. 1 and 2, a method and apparatus for installing an insulation material, 30, such as ceramic fiber module, to a surface 32, such as a boiler, a furnace, a heat exchanger, or other vessel or surface to be insulated, utilizing a welding gun 10, which can be a standard MIG welding gun, a manual MIG welding gun or a MIG welding gun capable of variable speed, motorized drive rolls (i.e., a "push pull gun"), which exerts a pulling force on an electrode 28 at the same time the electrode 28 is pushed from a wire feed unit 54. The welding gun 10 includes a handle 12, a neck 14, a control switch or trigger 16, a nozzle 18, a power cable 20 and a gas hose 22. A gas nozzle 24 and a contact tip 26 are located within the nozzle 18 of the welding gun 10. The nozzle 18 is affixed at a terminal end of the neck 14 of the welding gun 10, opposite the handle 12.

Unlike current straight-necked MIG welding guns, the neck 14 of the welding gun 10 is straight or linear and has a sufficient length to pass through the insulation material 30 to be installed. In addition, the diameter of the neck 14 of welding gun 10 should be sufficiently large to frictionally engage the insulation material 30 for hoisting and positioning during installation. There may be approximately 0.5 inch clearance between the handle 12 of the welding gun 10 and insulation material 30.

Thus, the welding gun 10 serves at least two distinct functions, apart from the welding function. The welding gun 10 having a straight or linear neck 14 holds and supports the insulation material 30 during the installation and welding of an anchor 34 of the insulation material 30 to the surface 32. Further, the straight or linear neck 14 of the welding gun 10 having a sufficient diameter to frictionally engage the insulation material 30 enables a one handed installation of the insulation material 30 to the surface 32.

The nozzle 18 of the welding gun 10 may be insulated in order to isolate the energized contact tip 26 from the nozzle 18. The nozzle 18 of the welding gun 10 may also include two or more V-shaped cut-outs at a terminal end. The cut-outs enable a shielding gas 56 to escape from the nozzle 18 of the welding gun 10 when the weld is made and while the nozzle 18 of the welding gun 10 is in contact with the surface 32. The nozzle 18 of the welding gun 10 may be constructed of brass or copper.

Figure 3:
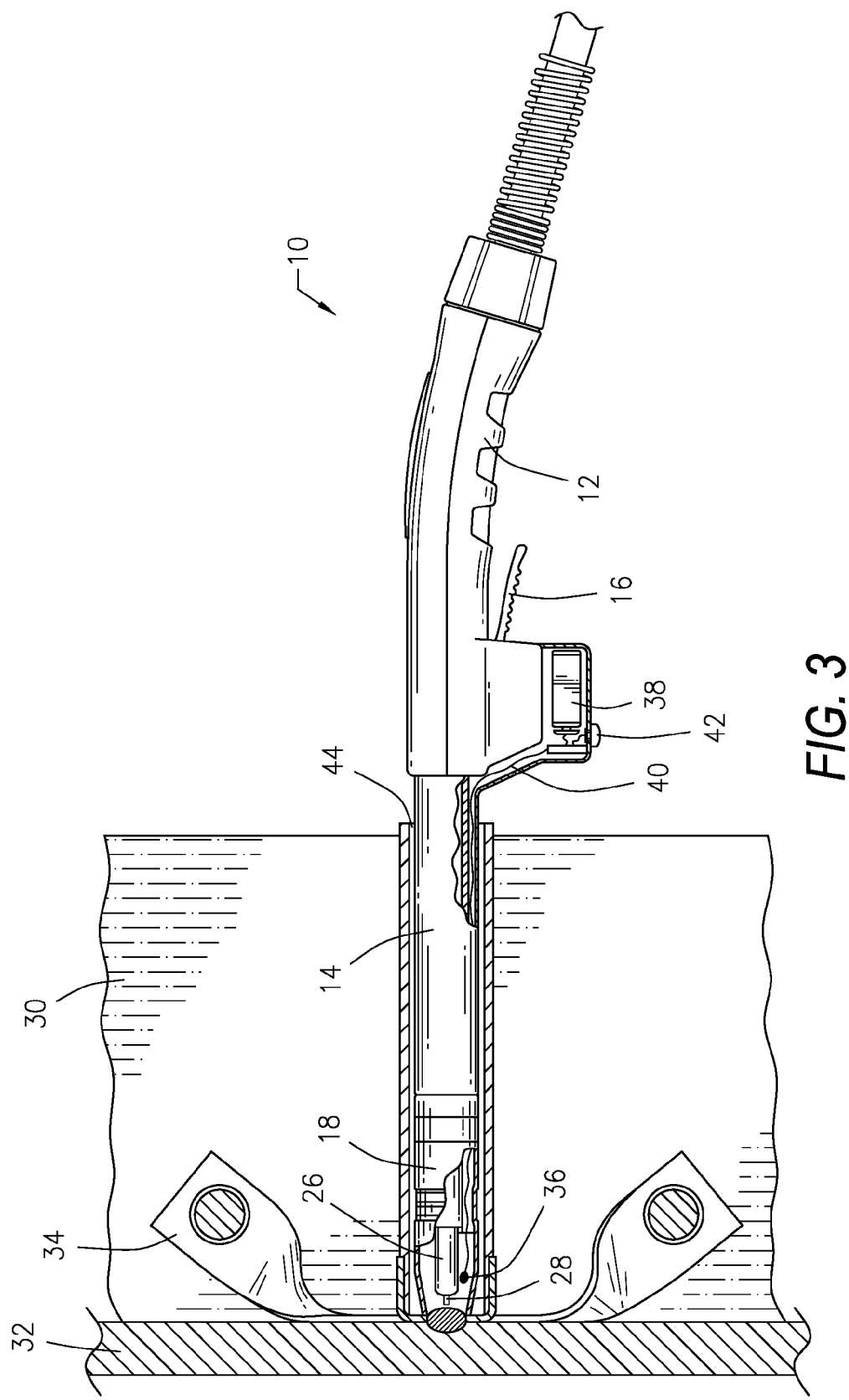
FIG. 3 is a partial cutaway view of an example of a welding gun having a continuity sensor in accordance with an illustrative embodiment of the method and apparatus for installing an insulation material to a surface disclosed herein.

The welding gun 10 may be equipped with a continuity sensor 36 as shown in FIG. 3. Since consistent and high quality MIG spot welds and MIG spot plug welds require solid contact between the anchor 34 and the surface 32 (i.e., vessel or other surface to be insulated), the continuity sensor 36 ensures proper contact between the anchor 34 and the surface 32. The continuity sensor 36 may utilize low-voltage to detect when the anchor 34 and the surface 32 are in direct contact. The continuity sensor 36 may be integrated into the welding gun 10. The continuity sensor 36 may include a separate power source 38, such as a 9-volt battery. The continuity sensor 36 may be electrically connected to the nozzle 18 of the welding gun 10 using an electrical wire 40.

During operation, the nozzle 18 and the neck 14 of the welding gun 10 are inserted into a channel 44 in the insulation material 30 until making contact with the anchor 34 embedded within the insulation material 30. An installer 46 pushes the welding gun 10 forward until the nozzle 18 of the welding gun 10, the anchor 34 and the grounded surface 32 to be insulated are in contact. When the nozzle 18 of the welding gun 10, the anchor 34, and the grounded surface 32 are in metal-to-metal contact, a circuit is completed and a continuity of low voltage is sensed resulting in an indicator 42 (e.g., a visual indicator, such as an LED, or an audible indicator, such as a tone or a beep emitted from a speaker) to be activated. The indicator 42 may be mounted on or integrated into the welding gun 10 to alert the installer 46 of continuity, such as on the handle 12 of the welding gun 10.

Figure 4:
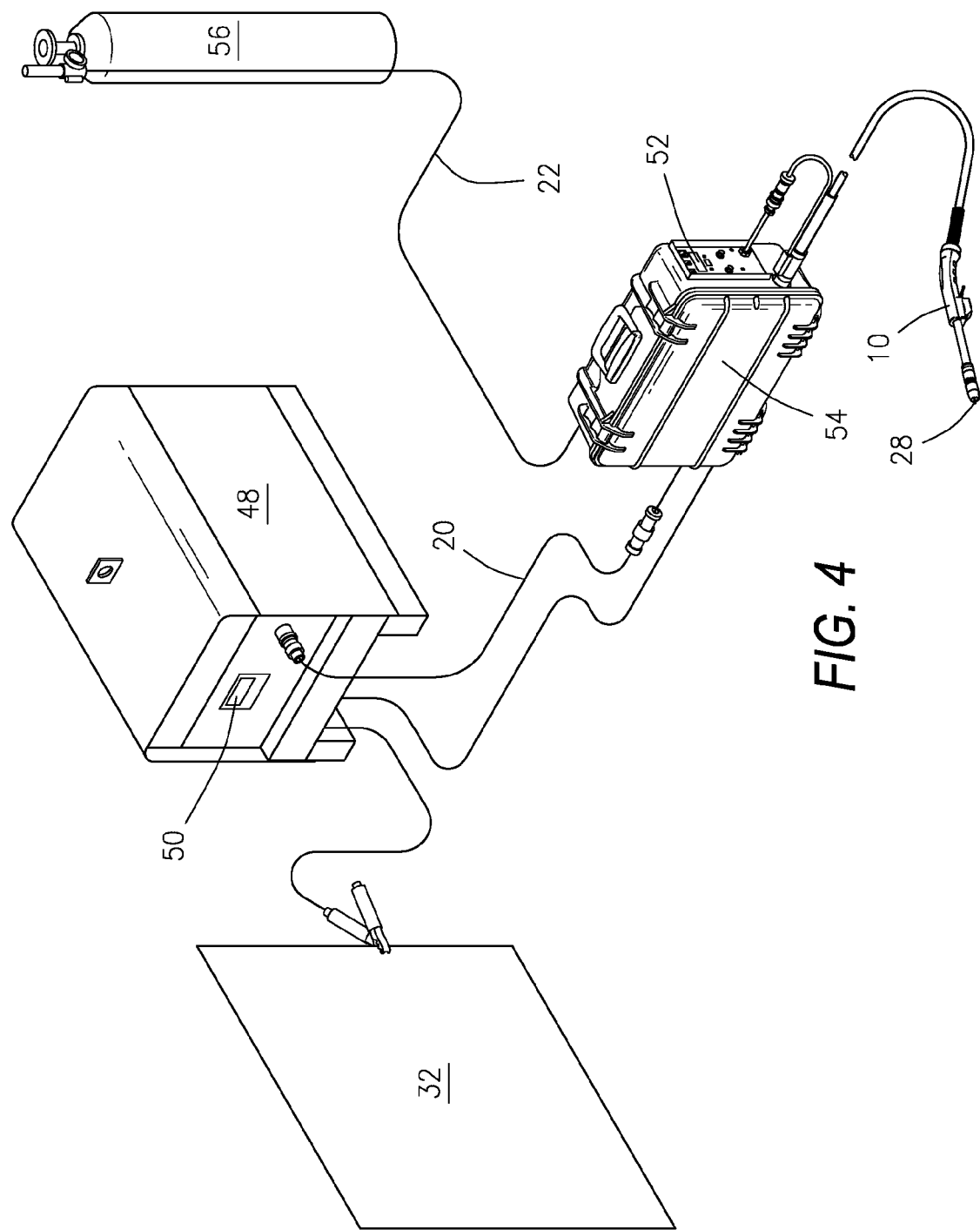
FIG. 4 is a perspective view of an example of a welding assembly in accordance with an illustrative embodiment of the method and apparatus for installing an insulation material to a surface disclosed herein.

Referring now to FIG. 4, connected to the welding gun 10 is a suitable GMAW power source 48. The power source 48 may be a constant voltage power source, for example a portable constant voltage unit, such as the Miller® XMT™ 350 CC/CV Auto-Line™ (MILLER ELECTRIC MFG. CO., Appleton, Wis.), a generator, an inverter or a pulsed MIG power source. A variable timer control 50 is configured to open and close the power source 48. The timer control 50 specifies the spot weld arc time, which may be set between approximately 0.25 seconds and approximately 4.0 seconds. The timer control 50 aids in quality control by providing a weld time that is both accurate and consistent. To ensure a correct time, a calibrated digital time readout 52 may be provided with the power source 48 and the timer control 50. The readout 52 may be located at a wire feed unit 54 or may also be located in proximity to the installer 46 to permit convenient viewing. The power source 48 provides a weld current between approximately 100 amps and approximately 450 amps and provides a voltage between approximately 20 volts and approximately 33 volts.

The electrode 28 may be supplied by way of the wire feed unit 54, such as a portable, variable speed MIG wire feed unit, for example the Miller® SuitCase 12RC (MILLER ELECTRIC MFG. CO., Appleton, Wis.). The electrode 28 feed rate may range from approximately 200 inches per minute to approximately 1000 inches per minute. Supplied to the wire feed unit 54 on a reel or spool, the electrode 28 may be any suitable material, including but not limited to carbon steel, such as 70S-3 or 70S-6 carbon steel, stainless steel, such as 304, 308, 309 or 310 stainless steel, or austenitic nickel-based superalloys, such as Inconel® alloy 601 (SPECIAL METALS CORP., Huntington, W. Va.). Electrode 28 diameters of approximately 0.035 inch (approximately 0.9 mm) to approximately 0.0625 inch (approximately 1.6 mm) may be utilized.

The wire feed unit 54 may include a variable burnback control. The burnback setting may be between approximately 0.5 inch (15 mm) and approximately 1.57 inches (40 mm). An electrode extension may also be utilized to minimize electrode 28 burnback to the contact tip 26 of the welding gun 10 as each timed weld is made. A short contact tip 26 and a long nozzle 18 for the welding gun 10 assist in providing the correct electrode extension from the contact tip 26 of the welding gun 10 to the work surface 32.

The gas nozzle 24 of the welding gun 10 is in fluid communication with a source of shielding gas 56. The shielding gas 56 is passed through the gas hose 22 to the gas nozzle 24 of the welding gun 10. The shielding gas 56 may be selected from the following gases: a single reactive shielding gas, such as Ar or $CO_2$; a two-component shielding gas mixture, such as $Ar/CO_2$, $Ar/O_2$ or Ar/He; a three-component shielding gas mixture, such as $Ar/CO_2/O_2$, $Ar/CO_2/He$, or $Ar/O_2/He$; or a four-component shielding gas mixture, such as $Ar/CO_2/O_2/He$. For example, 90% He, 25% $CO_2$, 98% Ar and 2% $O_2$, 85% Ar and 15% $CO_2$, 80% Ar and 20% $CO_2$, or 75% Ar and 25% $CO_2$ shielding gas mixtures may be utilized; however, the selection of a specific shielding gas mixture is dependent upon the particular welding application. The shielding gas 56 may be delivered at a flow rate of between approximately 10 cubic feet per hour to approximately 90 cubic feet per hour, for example, between approximately 34 cubic feet per hour and approximately 45 cubic feet per hour. The shielding gas 56 may be eliminated with the use of flux-core welding wire as the electrode 28.

In general during operation, the nozzle 18 of the welding gun 10 is pressed to the anchor 34 and the trigger 16 of the welding gun 10 is pressed by the installer 46 initiating the wire feed unit 54, a timed current and voltage to be supplied from the power source 38 and a flow of shielding gas 56, resulting in an electric arc to be struck. The wire feed unit 54 supplies the electrode 28 to the welding gun 10 by driving it through an electrode conduit, which guides and protects the electrode 28, and onto the contact tip 26. The contact tip 26 of the welding gun 20 is connected to the power source 48 through the power cable 20 and transmits the electrical energy to the electrode 28 while directing it to the surface 32 and the anchor 34 to be welded. The contact tip 26 allows passage of the electrode 28 therethrough while maintaining contact with the anchor 34. There are a number of factors that affect the specific weld current and voltage utilized with the method and apparatus for installing insulation materials 30 on the surface 32, including equipment, the composition of the material used to construct the anchor 34 of the insulating material 30, the thickness of the anchor 34, the size, if any, of a bore in the anchor 34, the composition of the surface 32 onto which the anchor 34 is to be welded, the type of electrode 28, the feed rate of the electrode 28, the type of shielding, gas 56, the shielding gas 56 flow rate, the burnback setting and the environment, such as temperature and humidity.

Figure 6A:
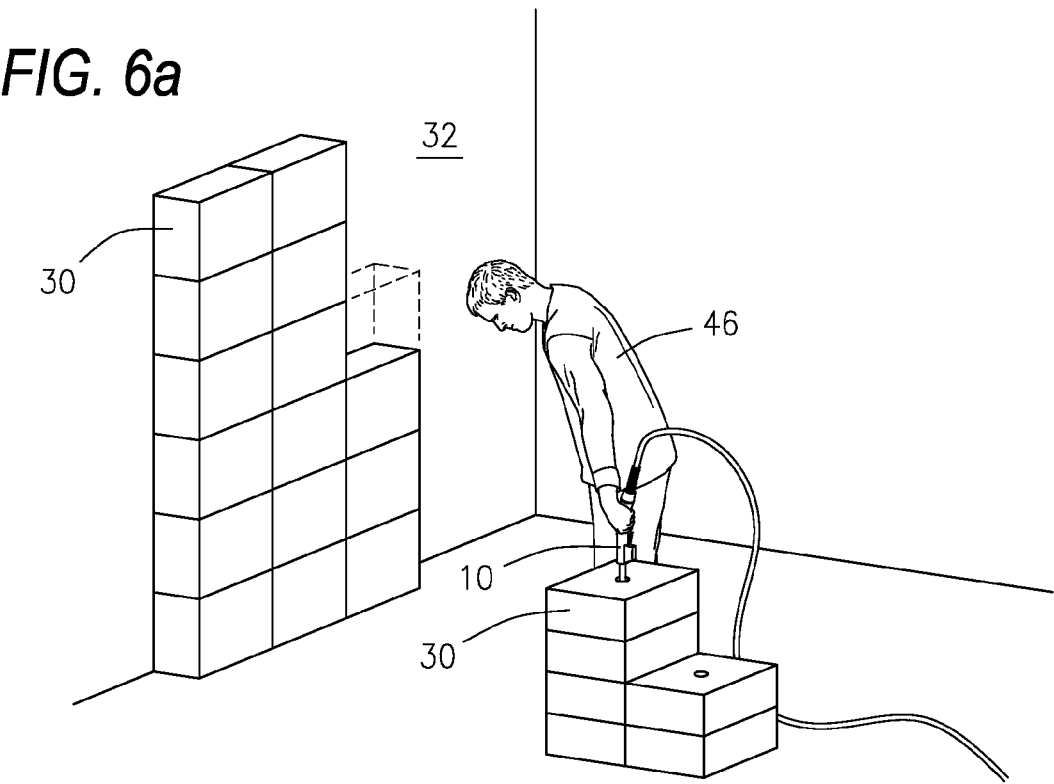
FIGS. 6a, 6b and 6c are sequential illustrations showing an example of an installer installing an insulation material in accordance with an illustrative embodiment of the method and apparatus for installing an insulation material to a surface disclosed herein.
Figure 6B:
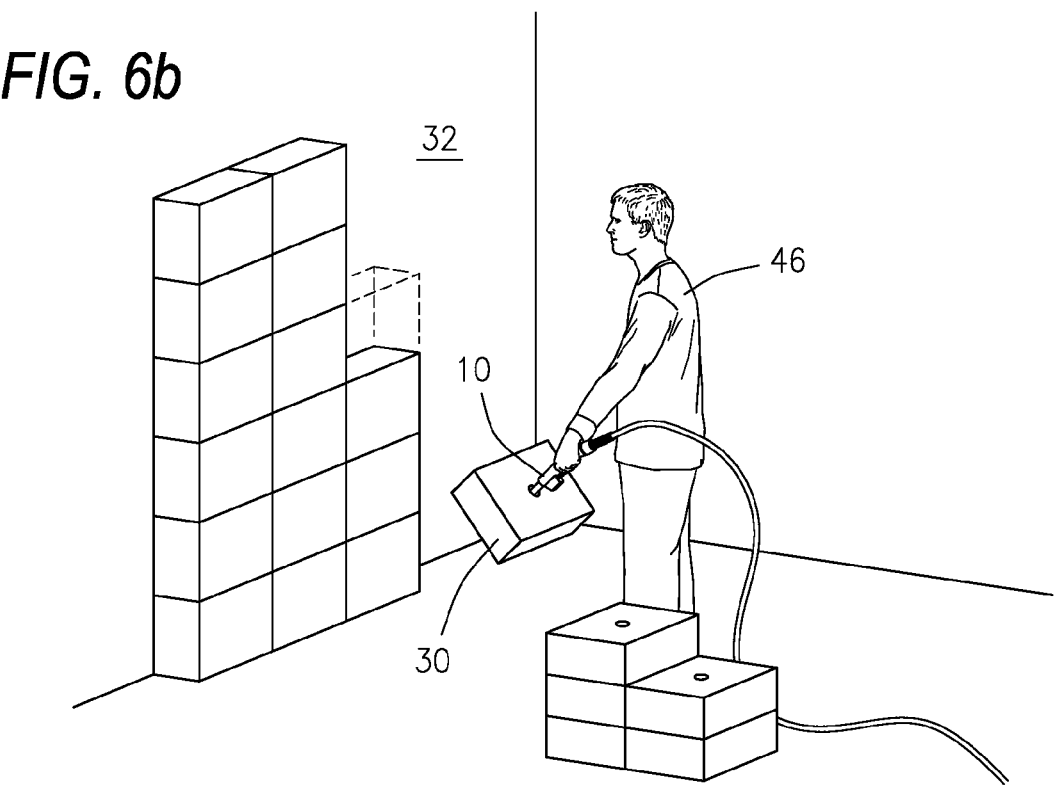
Figure 6C:
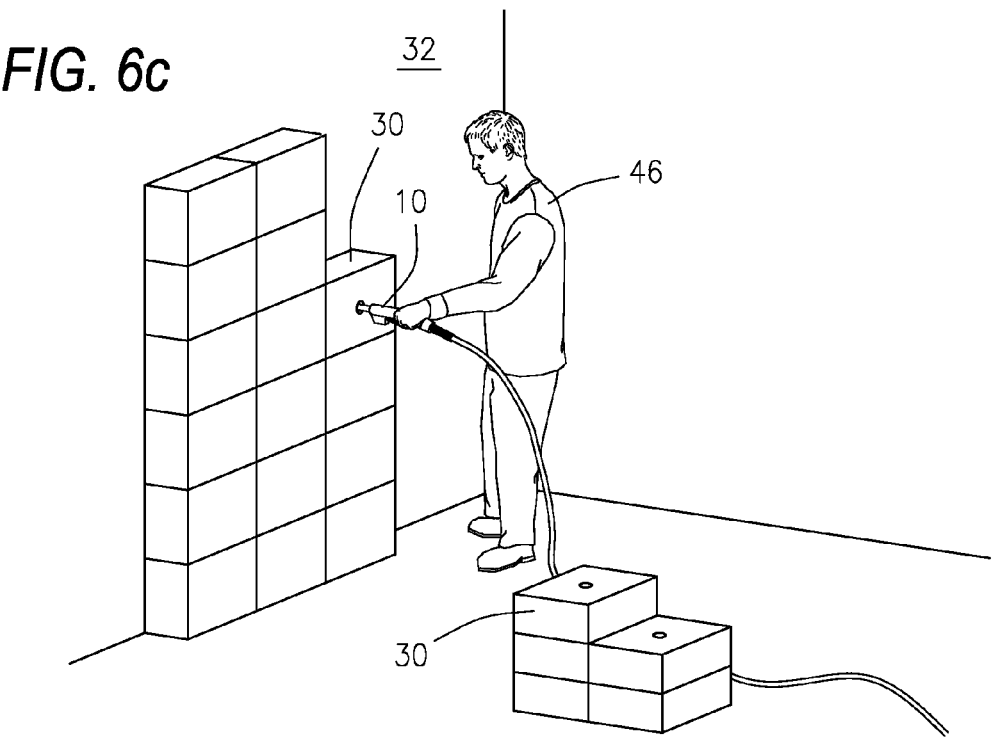
Figure 7A:
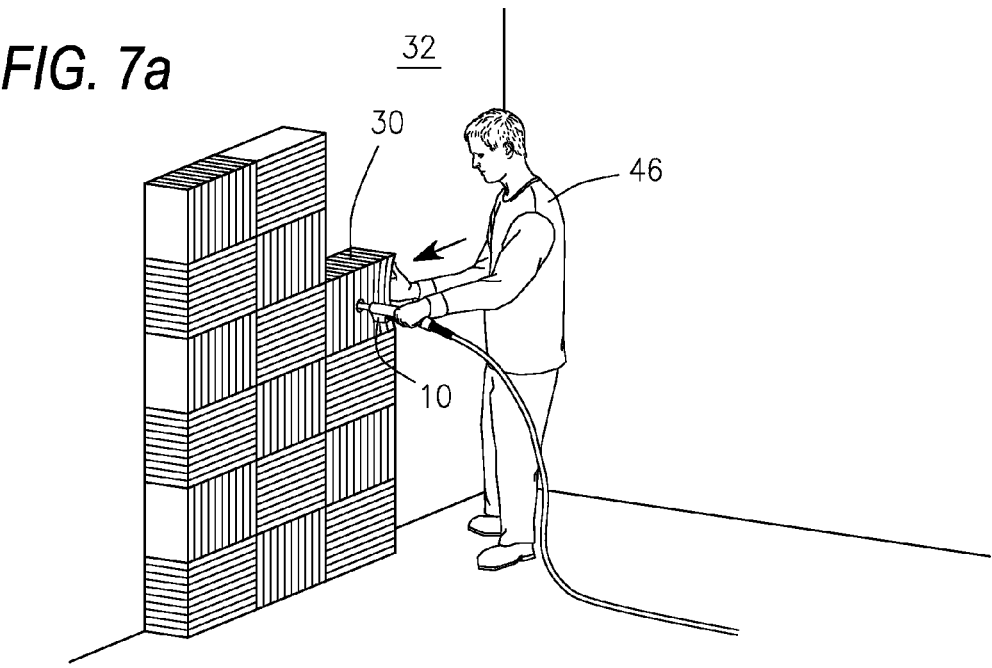
FIGS. 7a and 7b are sequential illustrations showing an example of a compression and quarter-turn installation of an insulation material in accordance with an illustrative embodiment of the method and apparatus for installing an insulation material to a surface disclosed herein.
Figure 7B:
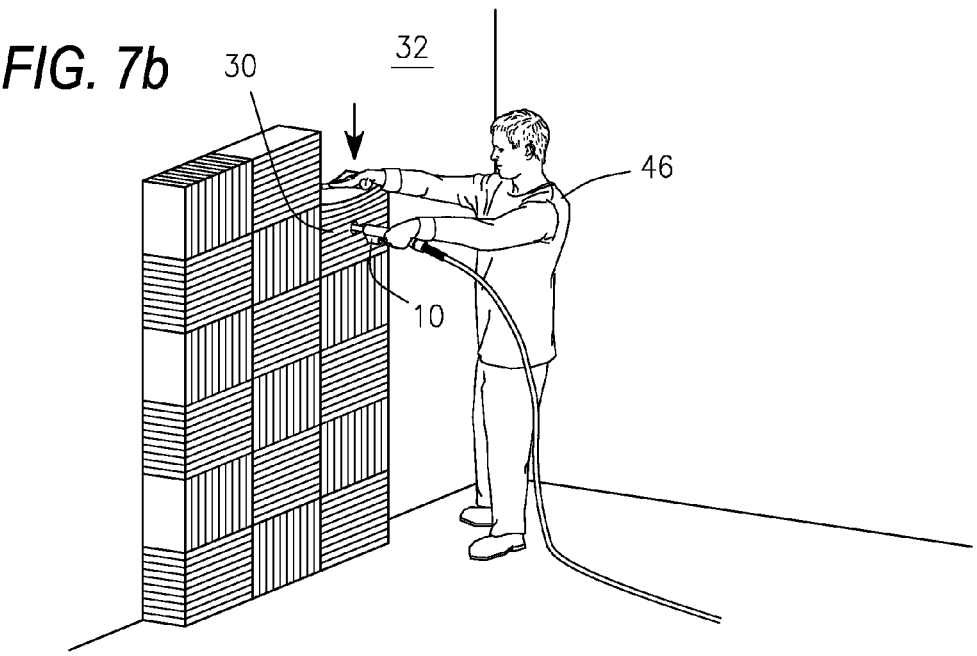
Figure 8A:
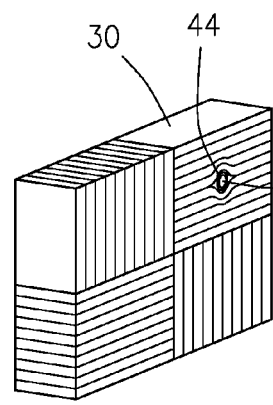
FIGS. 8a, 8b and 8c are sequential illustrations showing an example of the removal of the cardboard tube from, and the effects of ruffling the surface of, an insulation material in accordance with an illustrative embodiment of the method and apparatus for installing an insulation material to a surface disclosed herein.
Figure 8B:
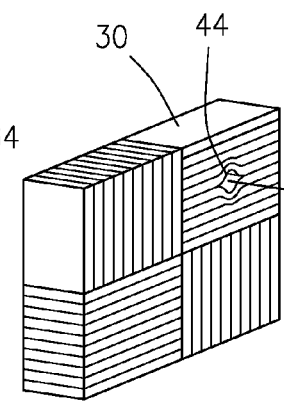
Figure 8C:
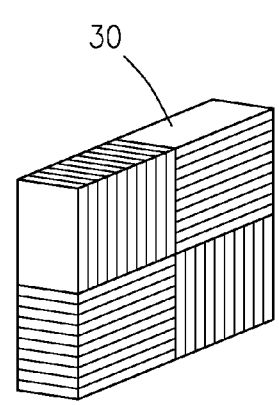

Referring now to FIGS. 6 through 8, depicting an illustrative manner in which the method and apparatus for installing the insulation material 30 to the surface 32 may be practiced. An insulation installer 46 may be situated inside of a vessel having the surface 32 to be insulated and in proximity to a supply of insulation materials 30, such as ceramic fiber modules 58. Also situated within the vessel is the welding gun 10, which is connected to the wire feed unit 54 by way of the electrode 28. The power source 48 is connected to the welding gun 10 by way of the power cable 20. Also connected to the welding gun 10 by way of the gas hose 22 is the source of shielding gas 56. The power source 38 does not need to be in the immediate vicinity of vessel; the only proximity limitation is the length of the power cable 20, which may be 400 feet or more.

Figure 5:
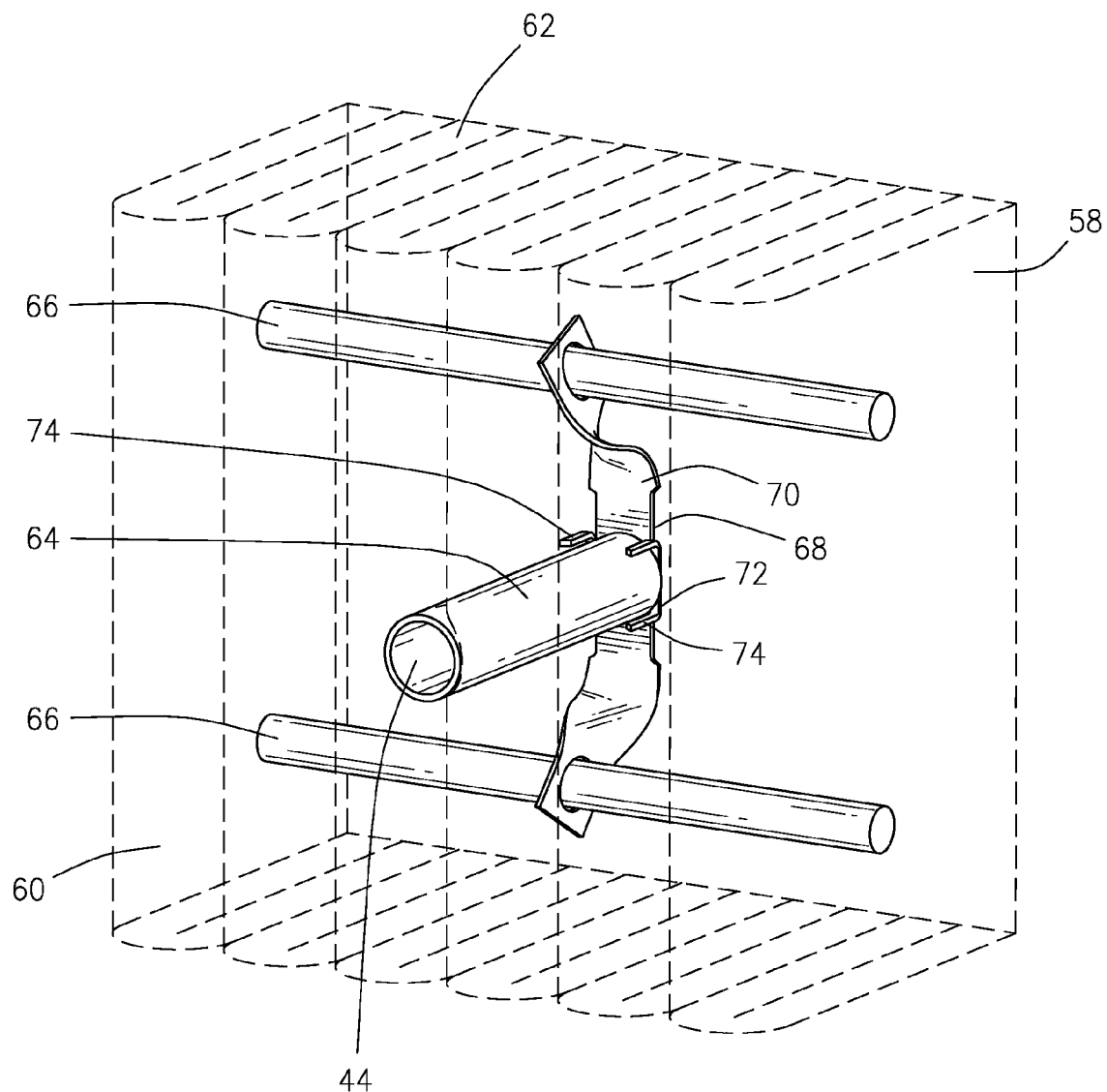
FIG. 5 is a cutaway view of an example of a ceramic fiber module in accordance with an illustrative embodiment of the method and apparatus for installing an insulation material to a surface disclosed herein.

Referring to FIG. 5, the insulation material 30 may be a ceramic fiber module 58, being generally rectangular and comprised of a plurality of tightly packed carbon fiber or ceramic sheets stacked side by side. The ceramic fiber module 58 may come in various dimensions, such as about twelve (12) inches by about twelve (12) inches, about twelve (12) inches by about six (6) inches, about twenty-four (24) inches) by about twenty-four (24) inches, etc., with a thickness ranging anywhere from about four (4) inches to about sixteen (16) inches. The ceramic fiber module 58 has a hot face 60, which will typically face the interior of the vessel, and a cold face 62, which attaches to the surface 32. The ceramic fiber module 58 includes a central axial channel 44 running from the hot face 60 to the cold face 62, which typically includes a cylindrical cardboard tube 64 removably seated therein. Once the ceramic fiber module 58 is installed on the surface 32 and the resulting installation is tested, the cardboard tube 64 may be removed and the channel 44 effectively closed by manually ruffling the ceramic fiber sheets as illustrated in FIG. 8. The channel 44 of the ceramic fiber module 58 enables the module 58 to be picked up by the welding gun 10 and enables the installer 46 to access the anchor 34 so that the anchor 34 and the ceramic fiber module 58 may be welded to the surface 32 using one hand.

Embedded within the ceramic fiber module 58 at the cold face 62 are the anchor 34 and two parallel support rods 66 interconnected with opposing ends of the anchor 34. A rear face 68 of the anchor 34 is exposed on an exterior of the cold face 62 of the ceramic fiber module 58, such that it may make direct contact with the surface 32. The support rods 66 within the ceramic fiber module 58 run parallel to the cold face 62 and the surface 32 to be insulated. A front face 70 of a central portion 72 of the anchor 34 includes a plurality of elongate protrusions 74. Each of the elongate protrusions 74 is substantially parallel and protrudes from the anchor 34 towards the hot face 60 of the ceramic fiber module 58 along the channel 44. It will be appreciated that there are a number of variations in anchor 34 design and how support is provided within the ceramic fiber module 58.

The anchor 34 may include a bore (not shown) within the central portion 72. The bore may be annular, ovate, rectangular, square or any other shaped bore. The size of the bore depends upon the particular welding application and may range from approximately zero (0) inches (for MIG spot welds) up to approximately 0.75 inch. The anchor 34 having the bore are installed using MIG spot plug welds, whereas the anchor 34 without the bore are installed using MIG spot welds.

The composition of material of the anchor 34 may be any suitable material, such as carbon steel or stainless steel. The anchor 34 may have a thickness from approximately 24 gauge (0.0239 inches/0.607 mm) to approximately 9 gauge (0.1495 inches/3.797 mm). The composition of material of the surface 32 to be insulated may be any suitable material, and the thickness of the surface 32 of the vessel may be any thickness, depending upon the vessel, such as a thickness from approximately 11 gauge (0.1196 inches/3.03784 mm) to approximately 0.5 inch (12.7 mm).

Turning now to FIG. 6, for installation of the insulation material 30 to the surface 32, the installer 46 inserts the nozzle 18 and the neck 14 of the welding gun 10 into the cardboard tube 64 embedded within the channel 44 closest the hot face 60 of the ceramic fiber module 58. The nozzle 18 of the welding gun 10 should make contact with the front face 70 of the anchor 34. The welding gun 10 is then used to lift or hoist the ceramic fiber module 58 into a desired position on the surface 32. Once the ceramic fiber module 58 is properly positioned on the surface 32, the installer 46 holds the welding gun 10 substantially perpendicular to the surface 32 and firmly pushes the welding gun 10 into the ceramic fiber module 58 until the nozzle 18 of the welding gun 10, the anchor 34 and the surface 32, which is grounded, are in metal-to-metal contact. The contact of the nozzle 18 of the welding gun 10, the anchor 34 and the surface 32 may be verified with the use of the continuity sensor 36 integrated into the welding gun 10; in such case, the indicator 42 of the continuity sensor 36 will indicate to the installer 46 when contact is obtained between the nozzle 18 of the welding gun 10, the anchor 34 and the surface 32. Once continuity of contact has been achieved (and possibly verified using the continuity sensor 36), the installer 46 maintains constant pressure to maintain contact and activates the welding gun 10 by way of the control switch or trigger 16. The timer control 50 specifies the spot weld arc time, which may be set between approximately 0.25 seconds and approximately 4.0 seconds. The welding gun 10 may be removed from the channel 44 in ceramic fiber module 58 once the ceramic fiber module 58 is installed on the surface 32.

Referring now to FIG. 7, subsequent installation of additional ceramic fiber modules 58 is typically performed in an alternating, quarter-turn fashion, such as that utilized in the installation of parquet flooring tiles. Because of the arrangement of the individual ceramic fiber sheets and the support rods 66 of the ceramic fiber module 58, the ceramic fiber module 58 is typically compressible in a first direction, but not in a second direction. In such a case, the installer 46 uses his or her free hand to compress the ceramic fiber module 58 a single direction, depending upon the orientation of the ceramic fiber module 58.

Once at least one of the ceramic fiber modules 58 is installed, the integrity of the installation may be tested using a special testing tool 76. The special testing tool 76 can test the torque strength of the installation, which may then be correlated to tensile load. The torque strength of the installation is highly dependent upon the composition of the materials (i.e., the anchor and the surface) present in the installation. As an example, the torque strength of the installation may be at least approximately thirty (30) inch-pounds, which may then be correlated to tensile strength depending upon the composition of the materials involved in the installation.

Figure 11A:
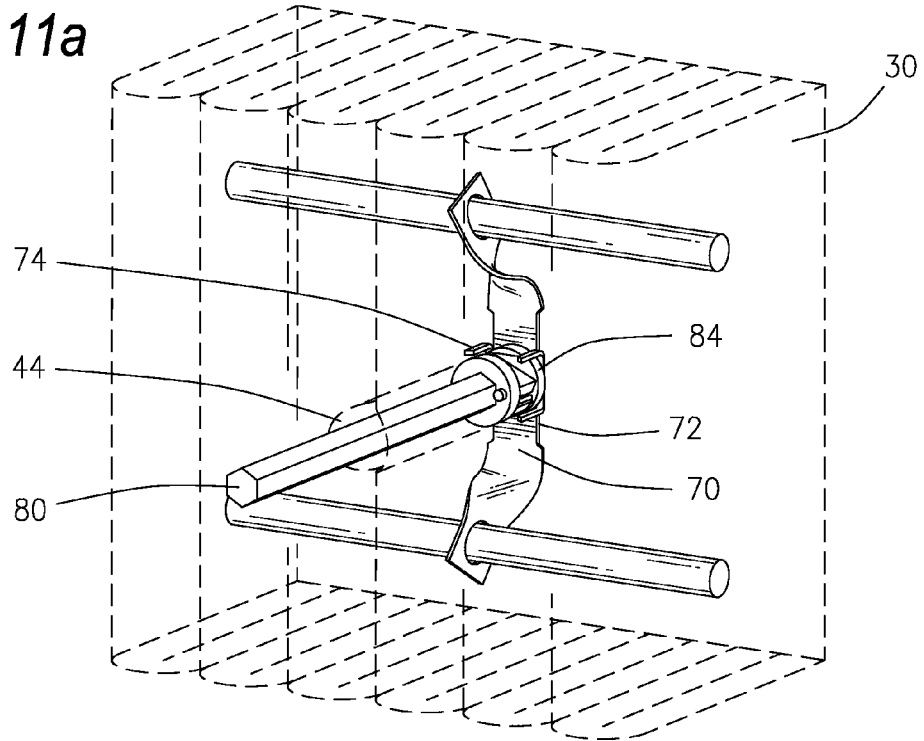
FIGS. 11a, 11b and 11c are sequential illustrations showing an example of testing the integrity of a weld using a special testing tool in accordance with an illustrative embodiment of the method for testing the integrity of a weld between an anchored insulation material and a surface disclosed herein.
Figure 11B:
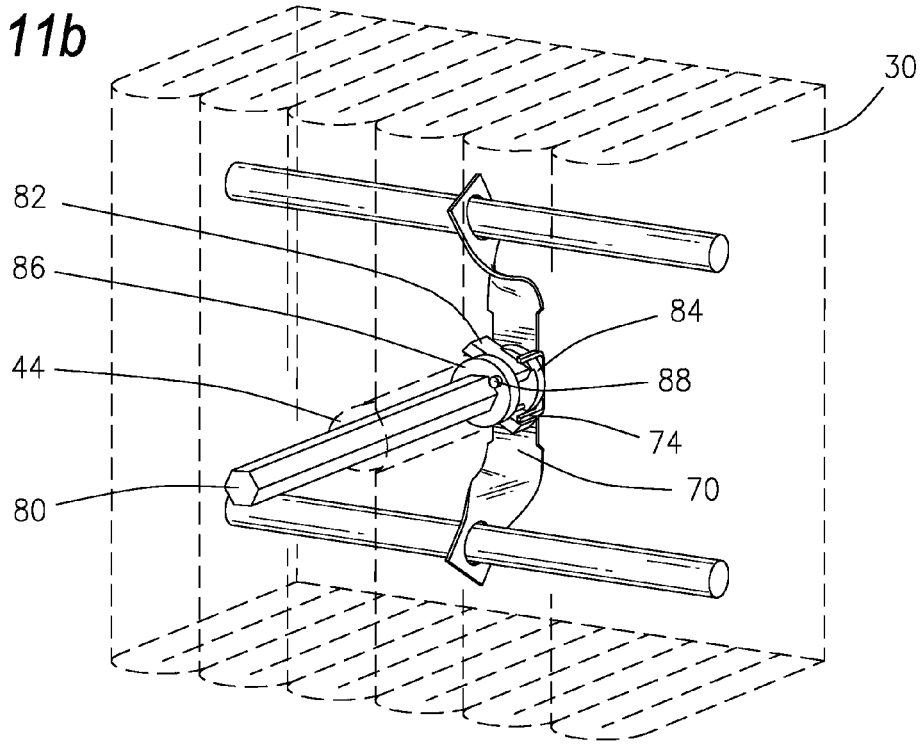
Figure 11C:
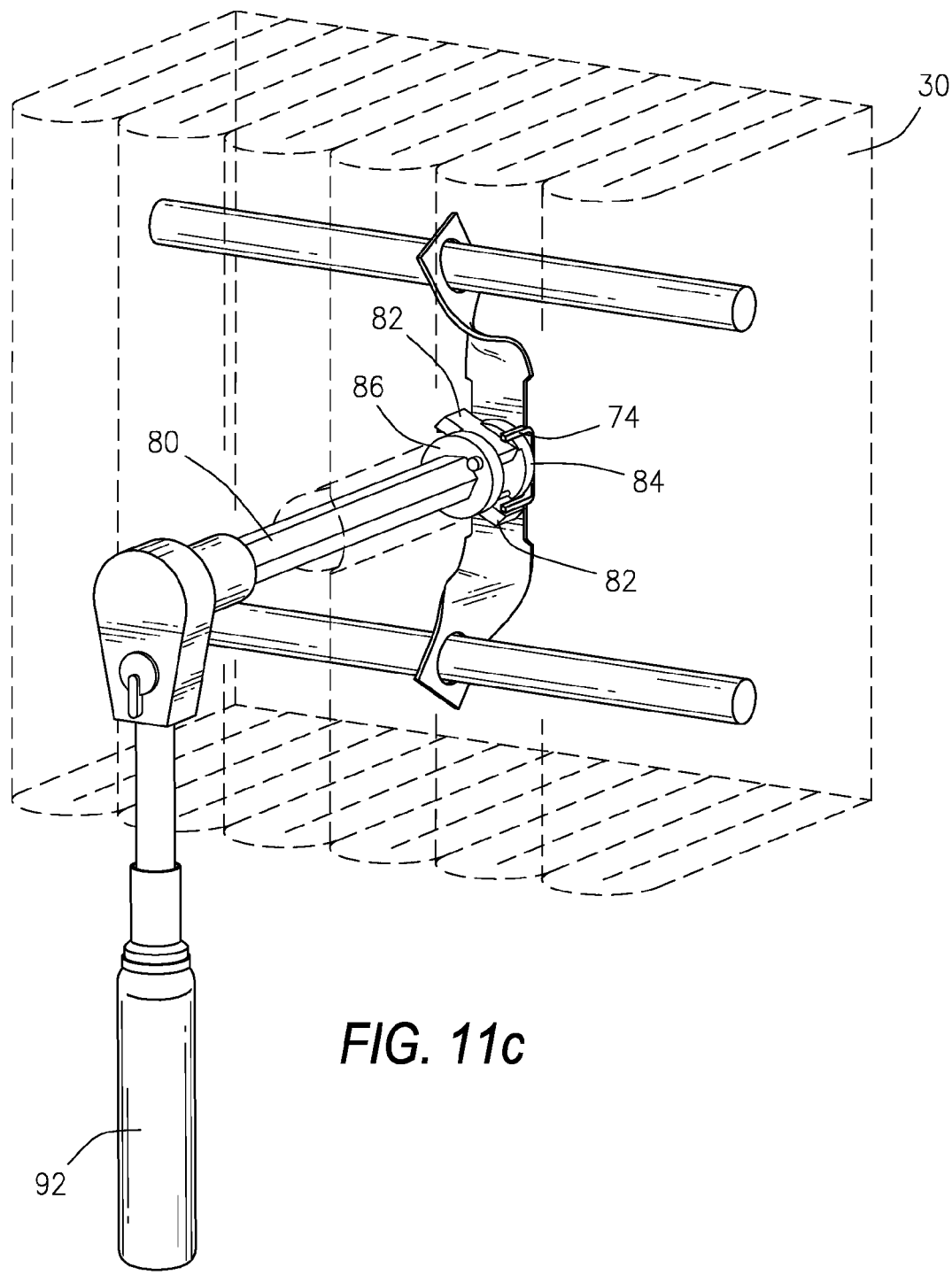

As illustrated in FIGS. 9 through 11, the special testing tool 76 includes a working end 78 with an opposing elongate handle 80. The elongate handle 80 of the special testing tool 76 should be longer than the thickness of the ceramic fiber module 58. The working end 78 of the special testing tool 76 includes a pair of teeth 82 capable of being moved between an open position (FIG. 10) and a closed position (FIG. 9). The working end 78 of the special testing tool 76 may include a pivot support plate 84 and a fixed support plate 86 with the pair of teeth 82 being pivotally attached therebetween using a pair of corresponding shafts 88. The fixed support plate 86 may be attached to a terminal end of the elongate handle 80, and the pivot support plate 84 may be linked to the fixed support plate 86 via a central bearing shaft 90.

As sequentially illustrated in FIG. 11, to test the installation of a ceramic fiber module 58, the cardboard tube 64 embedded in the channel 44 of the ceramic fiber module 58, if present, should be removed from the elongate protrusions 74 of the anchor 34, or approximately 0.5 inch out of the ceramic fiber module 58. In the closed position, the special testing tool 76 may then be inserted into the channel 44 of the ceramic fiber module 58 until the pivot support plate 84 engages the front face 70 of the anchor 34 between the elongate protrusions 74. Upon engagement between the pivot support plate 84 and the front face 70 of the anchor 34, the handle 80 of the special testing tool 76 may be rotated, such as in a counterclockwise motion, causing the pivot support plate 84 to rotate about the central bearing device 90, resulting in the teeth 82 pivoting about the shafts 88 from the closed position to the open position. In the open position, the teeth 82 of the working end 78 of the special testing tool 76 engage the elongate protrusions 74 on the front face 70 of the anchor 34. With the teeth 82 of the special testing tool 76 engaged with the elongate protrusions 74 of the anchor 34, a torque wrench 92 may engage, or be incorporated, a portion of the handle 80 of the special testing tool 76 outside of the ceramic fiber module 58. The torque wrench 92 may then be rotated until the torque wrench 92 "snaps" indicating the pre-set foot-pound requirements have been met. Once the integrity of the installation has been tested, the handle of the special testing tool 76 may be rotated, such as in a clockwise motion, causing the teeth 82 to disengage the elongate protrusions 74 of the anchor 34 and move from the open position to the closed position. Once disengaged, the special testing tool 76 may be removed from the channel 44 of the ceramic fiber module 58. As shown in FIG. 8, the cardboard tube 64, if present, may be removed from the ceramic fiber module 58 and the channel 44 effectively closed by manually ruffling the ceramic fiber sheets. The test may be performed after every weld, after a fixed number of welds, after a fixed period of time or at random.

Whereas, the devices and methods have been described in relation to the drawings and claims, it should be understood that other and further modifications, apart from those shown or suggested herein, may be made within the spirit and scope of this invention.

What is claimed is:

1. A method for installing an insulation material to a surface, comprising the steps of:
    inserting a nozzle and a neck of a welding gun through a channel in an insulation material;
    positioning said insulation material on a surface to be insulated using said welding gun;
    firmly pushing said welding gun into said channel of said insulation material until said nozzle of said welding gun, an anchor embedded in said insulation material and said surface are in contact;
    welding said anchor of said insulation material to said surface with said welding gun; and
    removing said nozzle and said neck of said welding gun from said channel in said insulation material.

2. The method of claim 1 further comprising the step of confirming continuity of contact between said anchor of said insulation material and said surface.

3. The method of claim 2 wherein said step of confirming continuity of contact is accomplished by a continuity sensor having an indicator mounted on said welding gun.

4. The method of claim 3 wherein said indicator is a visual indicator, an audible indicator or combination thereof.

5. The method of claim 1 further comprising the step of performing a test on said step of welding said anchor using a special testing tool.

6. The method of claim 5 wherein said step of performing said test on said step of welding said anchor using said special testing tool further comprises the steps of:
    inserting said special testing tool in a closed position into said channel of said insulation material;
    contacting a working end of said special testing tool to said anchor embedded in said insulation material;
    rotating an elongate handle of said special testing tool to cause said special testing tool to move from said closed position to an open position;
    engaging said working end of special testing tool with said anchor;
    applying a sufficient amount of torque to said handle of said special testing tool to test the integrity of said step of welding said anchor;
    rotating said handle to cause said special testing tool to move from said open position to said closed position; and
    removing said special testing tool from said channel in said insulation material.

7. The method of claim 5 wherein said step of performing said test is performed at an interval of after every weld, after a fixed number of welds, after a fixed period of time or at random.

8. The method of claim 1 wherein said insulation material is a ceramic fiber module having said anchor embedded therein, further comprising:
    said ceramic fiber module having a hot face positioned away from said surface and a cold face positioned against said surface;
    said ceramic fiber module having a pair of support rods interconnected with opposing ends of said anchor;
    said anchor having a rear face exposed on an exterior of said cold face of said ceramic fiber module;
    said anchor having a plurality of substantially parallel, elongate protrusions protruding from a central portion of a front face of said anchor; and wherein said support rods of said ceramic fiber module are substantially parallel to each other, substantially parallel to said cold face of said ceramic fiber module and substantially parallel to said surface.

9. The method of claim 8 wherein said central portion of said anchor further comprises a bore being sized up to approximately 0.75 inch.

10. The method of claim 1 wherein said anchor has a thickness between 9 gauge and 24 gauge.

11. The method of claim 1 wherein said welding gun further comprises:
a portable metal inert gas welding gun;
wherein said neck of said welding gun is substantially straight or linear;
wherein said neck and said nozzle of said welding gun have a combined length greater than a thickness of said insulation material; and
wherein said neck and said nozzle of said welding gun have a diameter sufficiently large to frictionally engage said channel in said insulation material.

12. The method of claim 1 wherein said step of welding said anchor utilizes a metal inert gas spot weld or a metal inert gas spot plug weld.

13. The method of claim 1 wherein said step of welding said anchor further comprises the steps of:
providing a current and a voltage from a power source to said welding gun using a power cable, wherein said power source provides said current between approximately 100 amps and approximately 450 amps, and wherein said power source provides said voltage between approximately 20 volts and approximately 33 volts;
opening and closing said power source via a variable timer control configured to provide spot weld arc time between approximately 0.25 seconds and approximately 4.0 seconds;
feeding an electrode from a wire feed unit to said welding gun, wherein said electrode is carbon steel, stainless steel, austenitic nickel-based superalloy or flux-core welding wire, wherein a diameter of said electrode is between approximately 0.035 inches and approximately 0.0625 inches, wherein said wire feed unit has a wire feed rate between approximately 200 inches per minute and approximately 1000 inches per minute; and
supplying a flow of a shielding gas from a source of shielding gas to said welding gun via a gas hose, wherein said shielding gas comprises one or more gases selected from the group consisting of carbon dioxide, argon, oxygen or helium, and wherein said flow of said shielding gas is between approximately 10 cubic feet per hour and approximately 90 cubic feet per hour.

14. The method of claim 13 wherein said wire feed unit is a portable, variable speed wire feed unit having a variable burnback control, and wherein said burnback control is set between approximately 0.5 inch and approximately 1.57 inches.

15. The method of claim 12 wherein said step of welding said anchor utilizes a weld transfer mode of gas metal arc welding spray transfer, gas metal arc welding globular transfer or gas metal arc welding pulsed transfer.

16. The method of claim 1 wherein said nozzle of said welding gun is brass or copper, wherein said nozzle of said welding gun has two or more V-shaped cut-outs, and wherein said nozzle of said welding gun is insulated.

17. The method of claim 1 further comprising the steps of removing a cardboard tube from said channel in said insulation material and manipulating said insulation material to fill in said channel in said insulation material.

18. The method of claim 1 wherein said steps for installing said insulation material to said surface are performed using one-hand of an installer.

* * * * *